Jan. 18, 1955 W. B. ROACH 2,699,573
MOLDING MACHINE SYSTEM
Filed May 7, 1951 4 Sheets-Sheet 1

INVENTOR.
WILLIAM B. ROACH
BY
J. Wesley Everett
ATTORNEY

Jan. 18, 1955

W. B. ROACH 2,699,573

MOLDING MACHINE SYSTEM

Filed May 7, 1951

INVENTOR.
WILLIAM B. ROACH
BY
ATTORNEY

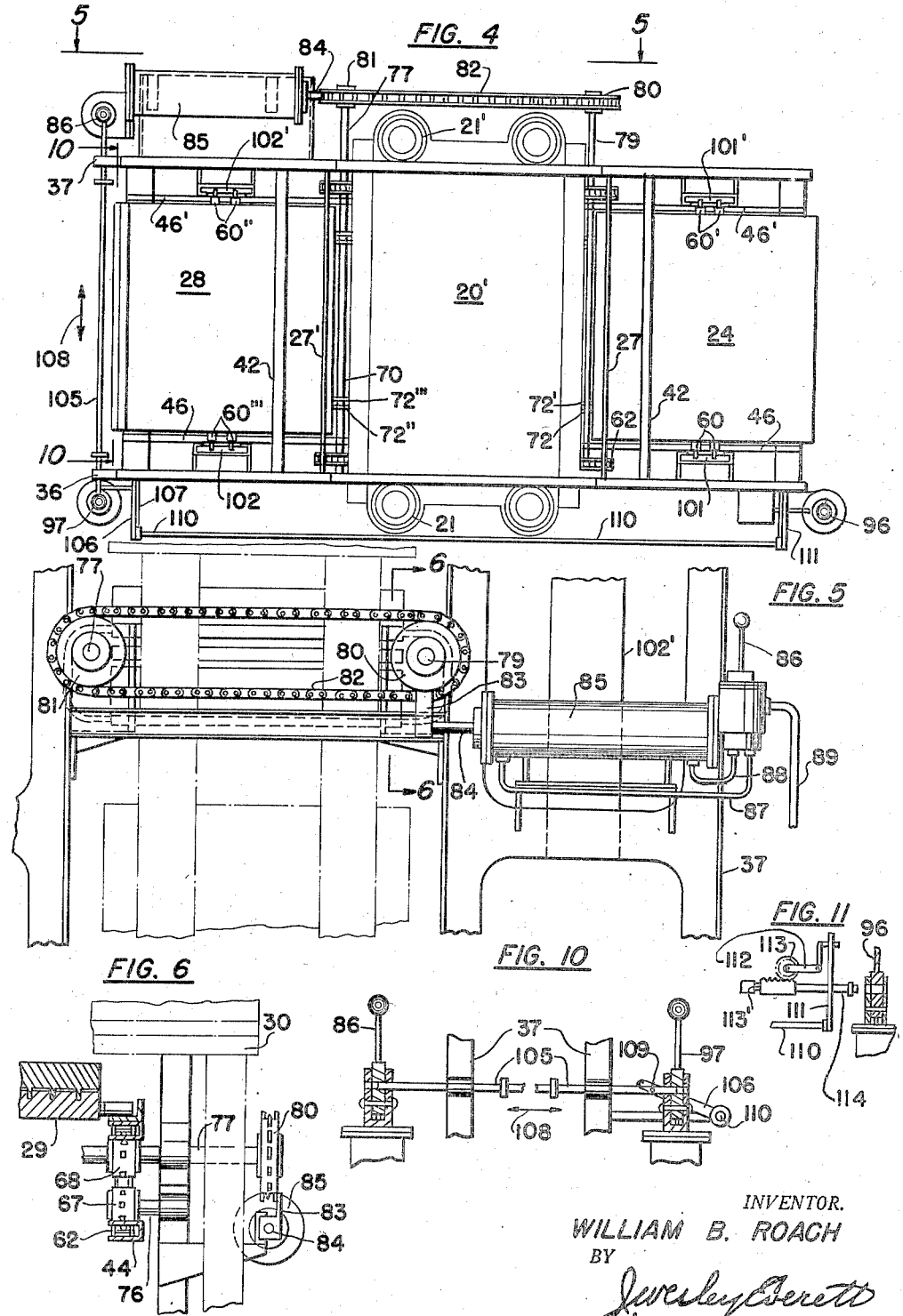

Jan. 18, 1955   W. B. ROACH   2,699,573
MOLDING MACHINE SYSTEM

Filed May 7, 1951

INVENTOR.
WILLIAM B. ROACH
BY
J. Wesley Everett
ATTORNEY

United States Patent Office 2,699,573
Patented Jan. 18, 1955

2,699,573

MOLDING MACHINE SYSTEM

William B. Roach, Elkton, Md.

Application May 7, 1951, Serial No. 225,000

8 Claims. (Cl. 18—17)

The present invention relates to an improved feeding mechanism and a method of feeding molds to a molding machine.

When it is necessary to leave the molds in a stationary type machine for a predetermined period for curing the material, it is desirable to utilize the curing time for removing the molded articles and recharging the molds with fresh materials. With the improved features of the present feeding mechanism, the machine may be worked to its fullest capacity and at the same time provide a much easier task for the operator.

The type of molding machine in which this particular feeding mechanism is a part, or is an accessory, is one principally used in the molding of rubber and plastic articles. These machines are of the stationary type and utilize both pressure and heat for converting the prepared material into the particular article. The material is usually in the form of a powder, or small pellets, which are introduced into a mold which is placed between two heating elements and pressure applied.

By building the present feeding device into a molding machine, or by adapting the feeder to a standard molding machine, the machine is made semi-automatic, in that, the laborious manual work is practically eliminated in addition to increasing the capacity of the machine.

The principal object of the invention is to provide improved means whereby the efficiency of a molding machine may be substantially increased by making certain operations mechanical and automatic, which were heretofore performed manually.

Another object of the invention is to provide a feeding mechanism that will be capable of operating the molds now in use thereby eliminating the necessity of providing a different type of mold.

Still another object of the invention is to provide means for opening the molds after they have been conveyed out of the machine.

While several objects of the invention have been pointed out, other objects, advantages and uses will be apparent as the nature of the invention is more fully disclosed, consisting of its novel construction, combination of elements and arrangement of parts as shown in the accompanying drawings and described in the detailed description forming a part of the specification, in which:

Figure 4 is a top plan view of the device shown in Figures 1 and 2.

Figure 5 is an enlarged fragmentary view in elevation of a part of the machine showing the operating means for carrying the mold in and out of the press.

Figure 6 is a sectional view taken along the line 6—6 of Figure 5.

Figure 10 is a sectional view taken along the line 10—10 of Figure 4.

Figure 11 is a detail view of the latching mechanism for one of the control throttles.

In pointing out certain parts of the machine in the specifications, like and similar reference characters will be used throughout the several views when practical.

Figure 1:
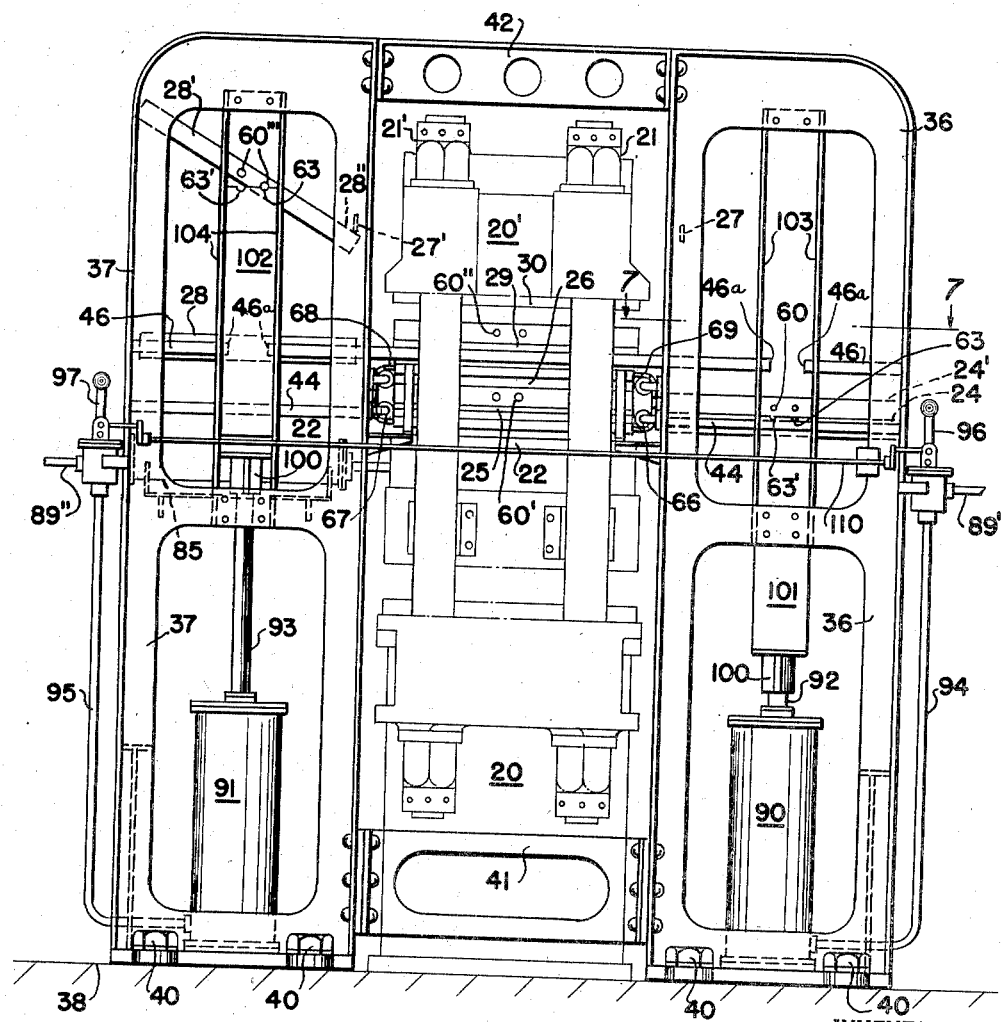
Figure 1 is a side elevation of a feeding device together with means for supporting and operating the same, together with a molding press.

The molding machine 20 is preferably of the type designed to accommodate two closed top openable molds, one above the other, there being a heating plate 22 upon which the lower mold 24 (see Figures 2 and 3) rests, and a heating plate 26 upon which the upper mold 28 rests. The heating plate 26 also acts as a heater for the top of the mold 24. Above the upper mold is a heating plate 30. This type press is of standard construction. The central heating element 26 floats on a spring arrangement (not shown) through a distance sufficient to allow for the vertical movement of the molds. The height of the head portion 20' of the press is adjustable in height by the nuts 21 and 21'.

Located adjacent the base of the machine is a hydraulic plunger, or piston, 32, which moves the member 34, carrying the heating plate 22, upwardly to contact the bottom of the mold 24 moving it upwardly in contact with the central heating plate 26. The central heating plate 26, being movable vertically within certain limits, is moved upwardly by the top of the lower mold until it comes in contact with the bottom of the upper mold, which in turn is moved until its top is in contact with the top heating plate 30. Pressure against the bottom of the piston 32 is comparatively high, pressing the molds and material within the molds against the heating plates, where the temperature is maintained for a limited time, the amount of heat and pressure depending primarily upon the kind of material used and the type of article being made.

The present device has to do primarily with the automatic, or semi-automatic, feeding of the molds into and out of the press, together with means for opening the molds after they have been removed therefrom. The type mold referred to is one in which the mold is split. In this particular instance, the mold is divided along a horizontal plane substantially half the thickness of the mold which provides a lower and an upper section. This, for example, is shown very well in Figures 1 and 2 at 28 and 28'.

As stated hereinbefore, the feeding mechanism may be made into and be a part of the machine, or it may be made as a separate unit and fixedly secured to a stationary type press, the general features being substantially the same in both instances.

As illustrated in Figure 1, the press 20 has associated therewith a framing 36 and 37 which may be anchored to the supporting surface 38 by the lugs 40 and 40' and held in location by the bracket 41 extending along the base of the press. The frame extends substantially higher than the space for receiving the molds within the press which is known as the mold receiving area. The frames 36 and 37 are fastened together at the top by the cross member 42. The length and width of the frame is such as to accommodate the length and width of the mold after it is conveyed out of the press, as shown at 24 and 28 in Figure 1. However, the frame 36 and 37 may be in the form of a superstructure supported entirely by the base of the press.

Figure 3:
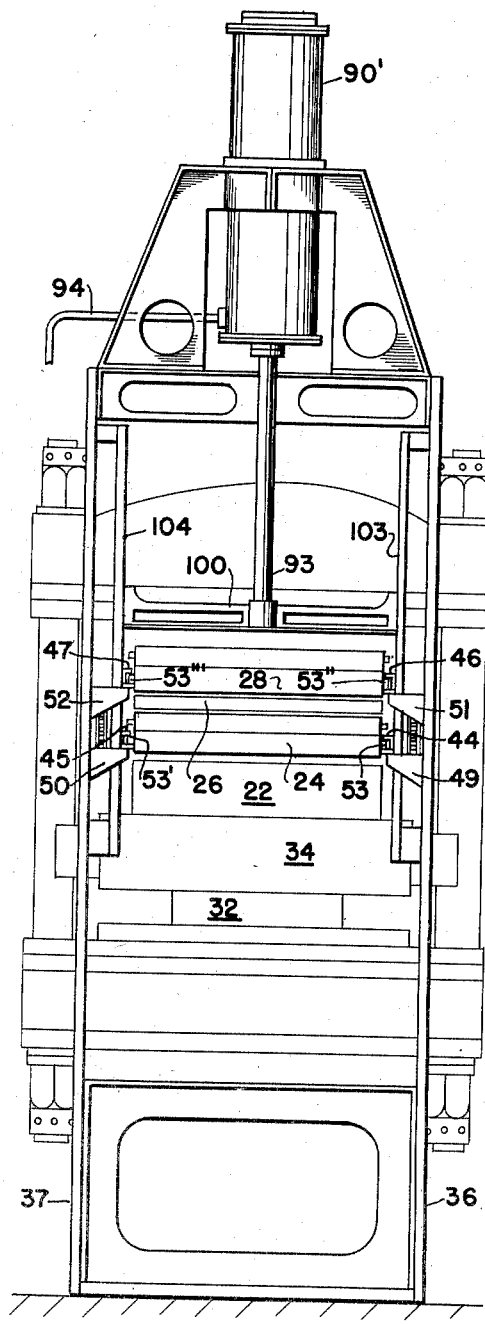
Figure 3 is a front elevation of a slightly modified form.
Figure 2:
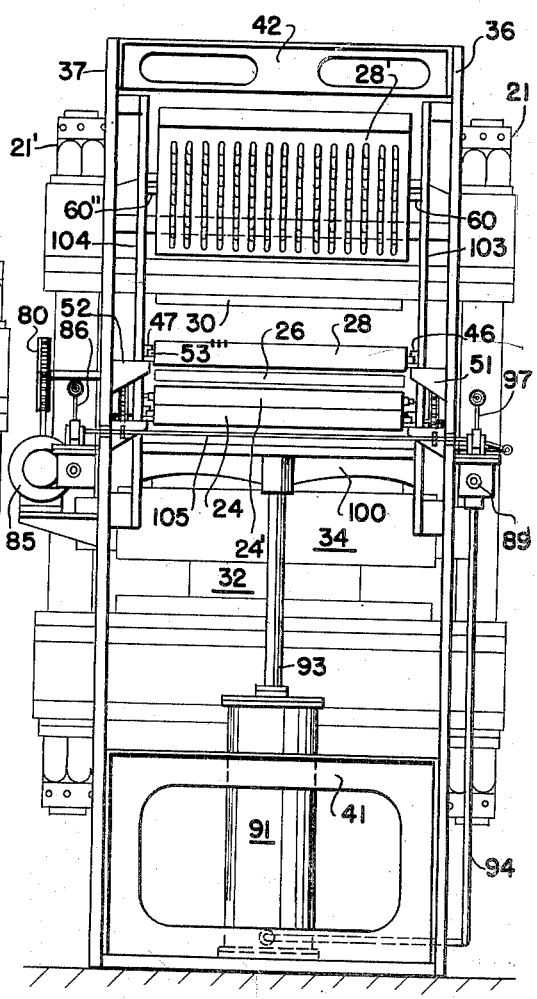
Figure 2 is a front elevation of the same.
Figure 7:
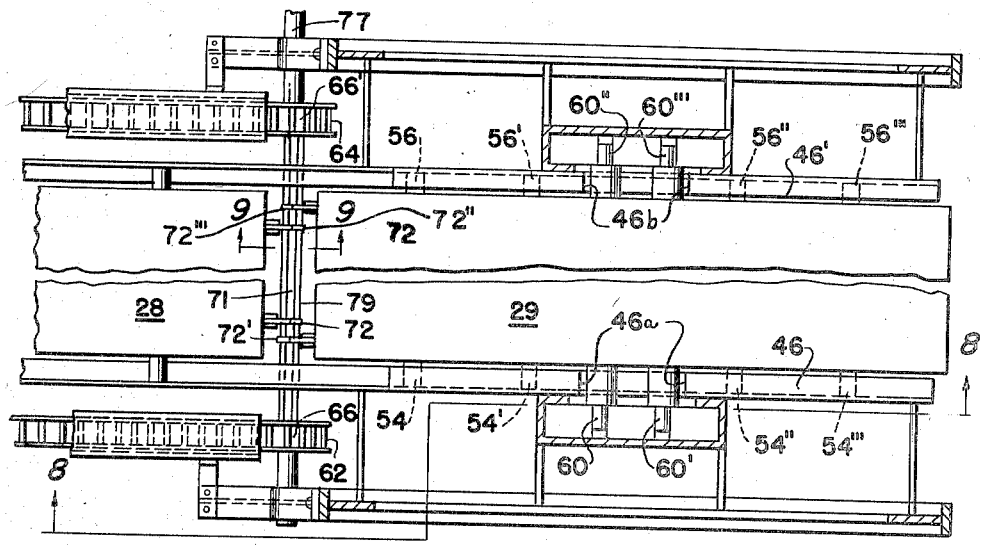
Figure 7 is a sectional view taken along the line 7—7 of Figure 1.
Figure 8:
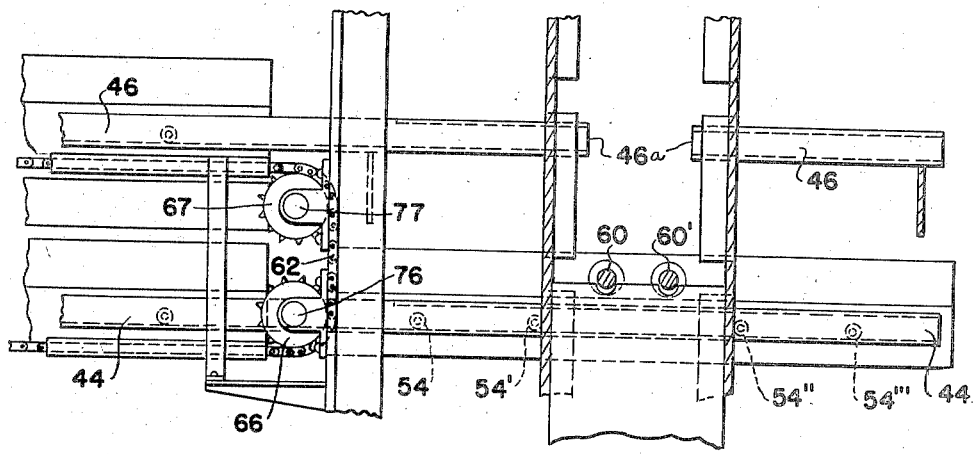
Figure 8 is a view partly in elevation and partly in section taken along the line 8—8 of Figure 7.

Fastened to the frame 36 and 37, and opposite the mold receiving area, are mold guide and supporting tracks 44, 45, 46 and 47. These guide and supporting members extend along each side of the mold area of the press and are secured and supported upon the frames 36 and 37 by means of brackets as shown at 49, 50, 51 and 52. Extending outwardly from each side of the lower section of the molds are mold supporting elements in the form of roller bearings 53, 53,' 53", and 53''' as shown in Figure 3. Each mold is preferably provided with eight of such roller bearings as illustrated in Figures 7 and 8 at 54, 54', 54" and 54''' on one side of the mold, and 56, 56', 56" and 56''' on the other side of the mold. The function of the guide members is to provide means for supporting the mold while it is being carried into the mold area of the press and also for supporting the mold when it is removed from the press. These mold guide members are in the form of a channel, the open side being adjacent the mold area as shown in Figures 2 and 3 from 44 to 47; however, the full channel only extends within the area of the frame 36 and 37, the upper horizontal portion of the channel being removed adjacent the mold receiving area to allow the disengaging of the mold supporting elements in order that the molds may be moved upwardly when the press is operated to compress them between the heating plates as previously described. With this arrangement the molds move along the tracks when the press is in open position annd the molds are out of contact with the heating plates.

In order to operate the present feeding device, it is necessary to use four molds, or mold facsimiles, to take up the space within the press. If, for example, it is desirable, the machine may be run at a reduced capacity by using only one or two molds. In such case the remaining number of molds up to four must be either run empty, or a dummy used.

Secured to each side of the upper half of the molds are pins 60, 60', 60" and 60''' as illustrated in Figures 7 and 8. These pins are for engagement with an elevator mechanism for opening the molds, and will be more fully described hereinafter (see members 101, 101', 102 and 102'). The spacing between the pair of pins 60 and 60' on one side of each upper mold section, and between the pair of pins 60" and 60''' on the opposite side thereof, is much less than the horizontal spacing of any pin from the nearest end of the mold section side from which the pin projects, and each pair of pins is centrally arranged so that a line of balance of the mold section extends across the section between its supporting pins, thus making it easy to tilt the mold on two opposite pins (60 and 60") and facilitating clearance of the pins during lifting of the upper mold section.

The upper guide channels 46 and 46' are cutaway at 46–a and 46–b for allowing the pins 60 to 60''' of the upper half of the lower mold to pass through the upper guide tracks when removing the upper half of the lower mold, as illustrated in Figure 2. The middle rollers are laterally offset on opposite sides of the pins (e. g., rollers 54' and 54" and pins 60 and 60' shown in Figures 7 and 8) to permit the aforesaid elevator mechanism to pass up between the middle rollers to engage and lift the pins of the upper mold section.

The means for moving the molds in and out of the press consists of a pair of chains 62 and 64 which are carried one on each side of the press and upon sprockets 66, 66', 67, 67', 68, 68', 69 and 69'. The present arrangement provides for carrying two molds in and out of the press on each of the two levels. In Figure 1, molds 24 and 25 are shown on the lower level, mold 25 being in the press area, and molds 28 and 29 being carried on the upper level, mold 29 being in the mold area of the press.

Running between the chains 62 and 64 are two bars 70 and 71. Bar 70 is shown carried by the upper level on the two chains, and bar 71 carried on the lower level of the chains. These bars are arranged directly opposite each other and move in opposite directions, that is, when the bar on the lower level is moving to the right, the one on the upper level is moving to the left.

Secured to the adjacent ends of the two molds on each level are latch members as illustrated at 72, 72', 72" and 72''' for engaging the cross bars 70 and 71 for moving the molds along the guide and supporting track members.

The chain sprockets 66 to 69 are supported upon 4 shaft members 76, 77, 78 and 79. Shafts 77 and 79 being driving shafts while shafts 76 and 78 are idling shafts; the idling shafts are adjustable in order that the correct tension on the chains may be maintained.

Secured to the outer ends of shafts 77 and 79 are a pair of larger sprockets 80 and 81 about which is a drive chain 82. This drive chain is preferably carried on the outside of the machine as shown in Figure 4. Fixedly secured to the drive chain 82 is a member 83 which is adapted to travel the entire distance between the sprockets 80 and 81. Secured to the outer end of the member 83 is one end of a piston rod 84, which is in turn connected with a piston carried within a cylinder 85 for oscillating the drive chain 82 about the sprockets 80 and 81 which in turn transmits the same motion in the mold-carrying chains 62 and 64. The piston is preferably hydraulically operated, but may be operated by air or other conventional means. By this arrangement the cross bars 70 and 71 are made to move back and forth through the mold areas of the press.

The fluid to the piston, operating the feeding mechanism, is controlled by the throttle 86 which operates a valve (not shown) to direct the fluid through pipe 87 for moving the piston toward the closed end of the cylinder and through pipe 88 for moving the piston toward the outer end of the cylinder. Pipe 89 is a fluid supply line for supplying fluid to the cylinder 85. While the fluid is shown controlled by a throttle, a foot lever, or other manual or automatic means, may be used.

Another feature of the invention is the elevating mechanism for removing the top of the mold when it has been conveyed out of the mold area of the press and on to the mold supporting track members carried by the frames 36 and 37.

This feature is provided with separate power units, such as hydraulic vertical cylinders 90 and 91 located adjacent the base of the frame members, and piston rods 92 and 93. Each of the cylinders 90 and 91 is connected with a fluid supplying line 94 and 95 which are controlled by throttles 96 and 97 respectively. However, the control throttle controlling the fluid pressure to the two cylinders 90 and 91 are so connected with the feeding control means through the linkage 105 to 114 that the feeding mechanism must be stopped before it is possible to direct the fluid to the elevating cylinders.

This linkage is best shown in Figures 4, 10 and 11. The bar 105 is preferably horizontally supported across the outer end of the frame 36 or 37 and is adapted to be operated by the operator controlling the feeding mechanism. The bar is movable in the direction of the arrow 108 and is for the purpose of locking both elevator control throttles against movement when the feed control throttle is being used. The bar is of such length that it will prevent the operation of either the feed throttle or both the elevator throttles.

Referring to Figure 10, the bar is shown locking both throttle members 86 and 97. When the bar is moved to the right, it will continue to lock the throttle 97 but will free throttle 86, the feed control throttle. When the bar is moved to the left, the feed throttle 86 will continue to be locked and the elevator throttle 97 will be released allowing for its operation to cause the fluid to enter the bottom of cylinder 91 and operate that respective elevator. The bar 105 is provided with a pin 109 which moves within a slot (not shown) within the lever 106, and will cause the lever to move through an arc as the bar 105 is moved back and forth. The lever is fixedly secured to a second bar 110 which extends along the side of the frames 36 and 37 and the press to the opposite end of the machine where there is a similar link member 111. This link member is connected with an arm 112 which in turn operates a gear wheel 113. Connected with the gear wheel is a short rack 113' adapted to be moved back and forth by the wheel. The rack is provided with a pin 114, which will lock and unlock the throttle member 96 along with the locking and unlocking of throttle 97. Therefore, both elevators may be operated when the bar member 105 is moved to the right, or left, as the case may be.

In Figure 3 there is shown a modified form of elevator in which the cylinder 90' is located adjacent the upper end of the frame. Over the outer end of the piston rod 93, is a cross-head 100. Secured to the cross-head are vertical side members (not visible), which are slidably guided by vertical guide members 103, 104 referring in particular to Figure 1. Adjacent the upper ends of the members 101 and 102 are recesses 63, 63" for receiving the pins 60 to 60''' carried by the cover, or upper half, of the mold for removing the same for allowing for the removal of the molded contents and recharging of the molds. For example, as the upper half 28' of the mold 28 (Figure 2) is moved upwardly, there is provided a member 27' fixedly secured to the frame 37 and so positioned to contact the inner edge 28" of the mold as it is being lifted. Upon contact with the member 27', the mold member 28' is tilted and pins 60 and 60" so that the inner face of the mold is presented outwardly, that is, it forms an acute angle with the plane of the lower half of the mold. This enables the operators to easily remove the molded article or contents from the mold after the molding operation. There is also a similar member 27 secured to the frame 36 for tilting the top section of the molds on the opposite end of the machine.

As both pistons 90 and 91 and their associated mold opening means are substantially identical, there seems to be no good reason for describing the operation and functions of both.

The upper guide and track members 46 and 46' are cut away as shown at 46–a and 46–b in order that the elevating members 101 and 102 may move uninterruptedly past the upper supports 46 when removing the top of the mold on the lower supports 44 and 44'.

Before the machine is put in operation, the heating elements must first be brought up to the proper temperature, and fluid pressure for operating the feeding and mold opening means is supplied to the machine through the supply lines 89, 89' and 89". The machine is adapted to be operated by two operators, one at each end. As only one throttle 86 is usually provided for the feeding mechanism, one of the operators at one end of the machine is responsible for feeding the molds in and out of the machine, the operation of one of the mold opening elevators, and controlling the elevator locking bar 105. However, the feeding may be controlled automatically which will, after a predetermined time, operate a valve similar to that operated by the throttle 86 for operating the piston within the cylinder 85 which in turn will move the molds in and out of the mold area of the press, and the mold opening means. After the period the mold spends in the press, it is delivered out of the mold receiving area of the press, on to the guide and mold supplying member within the frame members 36 and 37. After the molds have reached a designated place, the operators may then operate their respective throttles 96 and 97 separately and remove the upper half of the mold, or cover, from the mold after which the contents may be removed. The mold is re-conditioned and recharged with the particular material from which the molded articles are made.

The time for emptying and recharging the mold is slightly less than the time normally required to cure the articles, which means that the machine can and may be worked at its full capacity by utilizing the curing period for stripping and refilling the molds.

Figure 9:
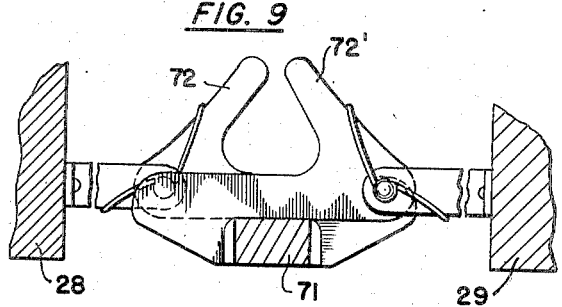
Figure 9 is an elevational view of a mold lug for engaging the mold carrying bar member.

In moving the molds in and out of the mold receiving area, the latches as shown at 72, 72', 72" and 72''' will engage the bars 70 and 71, as illustrated in Figure 9, and the molds will be moved along their respective guideways, moving one of the upper molds and one of the lower molds into the mold area of the press and at the same time moving an upper and lower mold out of the mold area of the press and into the areas of the frames 36 and 37. When the molds being moved out of the press have reached a particular location in respect to the frames 36 and 37, each operator may then individually remove the upper half of his mold by operating the throttle located adjacent his end of the machine. For example, in Figure 1 there is shown at the right of the machine a mold 24 in position on the lower guideway 44 and 44' to be opened, and at the left of the machine there is shown a mold 28 on the upper guideway 46 in which the top 28' has been removed. When the mold is first withdrawn from the press, the piston rods 92 and 93 are completely withdrawn as shown at the right side of the machine in Figure 1. The side members 101 and 101' are likewise withdrawn to their lowest position. By operation of either of the throttles 96 or 97, the fluid moves into the respective cylinders 90 or 91 causing the side members 101 and 101', or 102 and 102' to be moved upwardly on each side of the molds to engage the pins extending outwardly from the upper half or top of the molds, moving the top half upwardly and separating it from the lower half as shown in Figures 1 and 2.

The tilting of the upper half of the mold presents the inner face of the top toward the outside of the frame and to the operator where he may more easily strip the molded articles from the face of the mold.

After the mold has been stripped, the mold is conditioned with a conditioning compound and the bottom half of the mold filled again with whatever material is being used after which the operator will close the charged mold and have it ready to enter the press when the curing time of the articles contained in the mold within the press has expired.

While a particular form of apparatus has been illustrated and described, it is not intended as a limitation of the scope of the invention, as various changes may be made in construction and operation which would not depart from the broad general principles set forth, the scope of the invention being best defined in the appended claims.

I claim:

1. Apparatus for molding rubberlike material in upper and lower pairs of end-to-end horizontal molds each having vertically separable upper and lower mating sections, comprising a press for vertically compressing an upper mold and lower mold in superimposed relation, upper feed means for conveying the upper pair of molds between a first position in which one mold is in the press and the other mold extends outwardly on one side of the press and a second position in which the said other mold is in the press and the said one mold extends outwardly on the opposite side of the press, lower feed means for conveying the lower pair of molds at a lower level between like positions in which they extend alternately on said sides of the press, and one each side of the press means to open the upper and lower molds as they extend alternately on that side of the press, said opening means comprising means restraining vertical movement of one section of each of the latter molds as they extend alternately on that side of the press, and means vertically movable to engage opposite side portions of the mating section of each of the latter molds as they extend alternately on that side of the press, said opening means being operable to separate the two sections of the respective molds while maintaining the parallel relation of the sections during a substantial initial separating movement.

2. Apparatus for molding rubberlike material in upper and lower pairs of end-to-end horizontal molds each having vertically separable upper and lower mating sections, comprising a press for vertically compressing an upper mold and lower mold in superimposed relation, upper feed means for conveying the upper pair of molds between a first position in which one mold is in the press and the other mold extends outwardly on one side of the press and a second position in which the said other mold is in the press and the said one mold extends outwardly on the opposite side of the press, lower feed means for conveying the lower pair of molds at a lower level between like positions in which they extend alternately on said sides of the press, and on each side of the press means to open the upper and lower molds as they extend alternately on that side of the press, said opening means comprising means restraining vertical movement of one section of each of the latter molds as they extend alternately on that side of the press, means vertically movable to engage and pivotally support opposite side portions of the mating section of each of the latter molds alternately, and a fixed tilt stop engageable with the said mating section of each of the latter molds to cause it to pivot relative to the vertically movable means as the latter means continues its movement after initially opening the alternate molds, said opening means being operable to separate the two sections of the alternate upper and lower molds on the same side of the press in such manner as to maintain the parallel relation of the mating sections during a substantial initial separating movement and then to tilt one section relative to the other.

3. Apparatus for molding rubberlike material, comprising upper and lower pairs of end-to-end horizontal molds each having vertically separable upper and lower mating sections and vertical dowels maintaining their mating alignment, a press for vertically compressing an upper mold and lower mold in superimposed relation, upper feed means for conveying the upper pair of molds between a first position in which one mold is in the press and the other mold extends outwardly on one side of the press and a second position in which the said other mold is in the press and the said one mold extends outwardly on the opposite side of the press, lower feed means for conveying the lower pair of molds at a lower level between like positions in which they extend alternately on said sides of the press, and on each side of the press means to open the upper and lower molds as they extend alternately on that side of the press, said opening means comprising means restraining vertical movement of one section of each of the latter molds as they extend alternately on that side of the press, means vertically movable to engage and pivotally support opposite side portions of the mating section of each of the latter molds as they extend alternately on that side of the press, and a fixed tilt stop engageable with the said mating section of each of the latter molds to cause it to pivot relative to the vertically movable means as the latter continues its movement after sufficiently opening the alternate molds to disengage their vertical dowels, said opening means being operable to separate the two sections of the alternate upper and lower molds on the same side of the press in a manner which maintains the parallel relation of the mating sections during an initial separating movement at least sufficient for clearing the vertical dowels and then tilts one section relative to the other.

4. Apparatus for molding rubberlike material, comprising four horizontal molds each having vertically separable upper and lower sections, each upper section having lugs extending centrally from two opposite sides and each lower section having rollers extending from its corresponding opposite sides, said rollers being disposed laterally on both sides of said lugs, a press for vertically compressing an upper mold and lower mold in superimposed relation, upper feed means for conveying the upper pair of molds between a first position in which one mold is in the press and the other mold extends outwardly on one side of the press and a second position in which the said other mold is in the press and the said one mold extends outwardly on the opposite side of the press, lower feed means for conveying the lower pair of molds at a lower level between like positions in which they extend alternately on said sides of the press, said upper and lower feed means each including horizontal members extending outwardly on said sides of the press to support said rollers and having gaps therethrough vertically alignable with said plurality of lugs on the sides of the molds, and on each side of the press means to open the upper and lower molds as they extend alternately on that side of the press, said opening means comprising means restraining vertical movement of the lower section of each of the latter molds as they extend alternately on that side of the press, and means vertically movable through said gaps in said horizontal members to engage and lift said lugs on the upper section of each of the latter molds as they extend alternately on that side of the press, said opening means being operable to separate the two sections of the respective molds while maintaining the parallel relation of the sections during a substantial initial separating movement.

5. Apparatus for molding rubberlike material, comprising four horizontal molds each having vertically separable upper and lower sections, each upper section having a plurality of lugs extending centrally from each of two opposite sides and each lower section having supporting projections extending from its corresponding opposite sides, said projections being disposed laterally on both sides of said lugs, a press for vertically compressing an upper mold and lower mold in superimposed relation, upper feed means for conveying the upper pair of molds between a first position in which one mold is in the press and the other mold extends outwardly on one side of the press and a second position in which the said other mold is in the press and the said one mold extends outwardly on the opposite side of the press, lower feed means for conveying the lower pair of molds at a lower level between like positions in which they extend alternately on said sides of the press, said upper and lower feed means each including horizontal members extending outwardly on said sides of the press to support said projections, and having gaps therethrough vertically alignable with said plurality of lugs on the sides of the molds, and on each side of the press means to open the upper and lower molds as they extend alternately on that side of the press, said opening means comprising means restraining vertical movement of the lower section of each of the latter molds as they extend alternately on that side of the press, means vertically movable through said gaps in the horizontal members to engage and lift said lugs on the mating upper section of each of the latter molds alternately in such manner as to maintain the parallel relation of the sections during a substantial initial separating movement, and a fixed tilt stop engageable with the said mating section to cause it to pivot on two of the lugs as the vertically movable means continues its upward movement after the initial opening movement.

6. Apparatus for molding rubberlike material, comprising a press, a pair of end-to-end upper molds and a pair of end-to-end lower molds, each mold having upper and lower sections vertically separable, each upper section having two closely spaced and centrally located lugs extending from each of two opposite sides of the section, and each lower section having rollers extending from each of its corresponding opposite sides with a plurality of said rollers offset laterally on both sides of the adjacent pair of said lugs on the mating section, and on each of two opposite sides of the press mold conveying and opening means comprising a pair of upper parallel horizontal channel members opening toward each other to receive upper mold rollers and a like pair of lower members for lower mold rollers, said members having aligned vertical gaps therethrough, two sets of vertical guide members with the said pairs of horizontal members therebetween, and a mold opening member vertically movable along each set of said guide members while projecting into and passing through said gaps in the adjacent horizontal members, each mold opening member having a pair of notches pivotally engageable with adacent mold lugs to lift the attached upper mold section initially straight up, and stop means engageable with the lifted upper mold section to tilt it as the mold opening member continues its upward movement.

7. A mold for molding rubberlike material in a press, comprising upper and lower mold sections each having two opposite sides in vertical alignment with the corresponding sides of the other section, the lower mold section having a pair of widely spaced supporting means for horizontal travel projecting outwardly from each of its said pair of opposite sides, and the upper mold section having a pair of closely spaced lifting pins projecting outwardly from each of its said opposite sides and so disposed that a line of balance of the upper mold section passes between both pairs of pins, the spacing between the pair of pins projecting on each side being less than the horizontally-measured spacing between each pin and the nearer of the opposite ends of said side, whereby said pins are engageable for lifting the upper mold section on both pairs of pins and then tilting it on one of each of the pairs of pins; and each pair of said supporting means being laterally offset on opposite sides of the adjacent pair of pins so that a lifting member can be passed vertically up between each pair of supporting means to engage the pins and lift the upper mold section from the lower mold section.

8. A mold for molding rubberlike material in a press, comprising upper and lower mold sections each having two opposite sides in vertical alignment with the corresponding sides of the other section, the upper mold section having a pair of closely spaced lifting pins projecting from its opposite sides and so disposed that a line of balance of the upper mold section passes between both pairs of pins, whereby said pins are engageable for lifting the upper mold section on both pairs of pins and then tilting the section on one of each of the pairs of pins, the spacing between the pair of rollers projecting on each side being less than the horizontally-measured spacing between each pin and the nearer of the opposite ends of said side; and the lower section having four supporting rollers for horizontal travel spaced well apart horizontally along the side from which they project, the minimum spacing between adjacent rollers being substantially greater than the spacing between the pins on the same side plus the combined horizontal width of each of the two pins, and the middle rollers being laterally offset on opposite sides of the adjacent pair of pins so that a lifting member can be passed vertically up between the middle rollers on each side to engage the adjacent pins and lift the upper mold section from the lower mold section.

References Cited in the file of this patent

UNITED STATES PATENTS

| Number | Name | Date |
|---|---|---|
| 1,332,963 | Tucker et al. | Mar. 9, 1920 |
| 1,626,419 | Mell | Apr. 26, 1927 |
| 2,138,047 | Turner | Nov. 29, 1938 |
| 2,171,511 | Winegar et al. | Aug. 29, 1939 |
| 2,431,048 | Kilborn | Nov. 18, 1947 |
| 2,565,248 | Lyijynen | Aug. 21, 1951 |